J. B. HORNE.
SHOCK ABSORBER.
APPLICATION FILED MAR. 22, 1912.
1,123,878.
Patented Jan. 5, 1915.
3 SHEETS—SHEET 1.
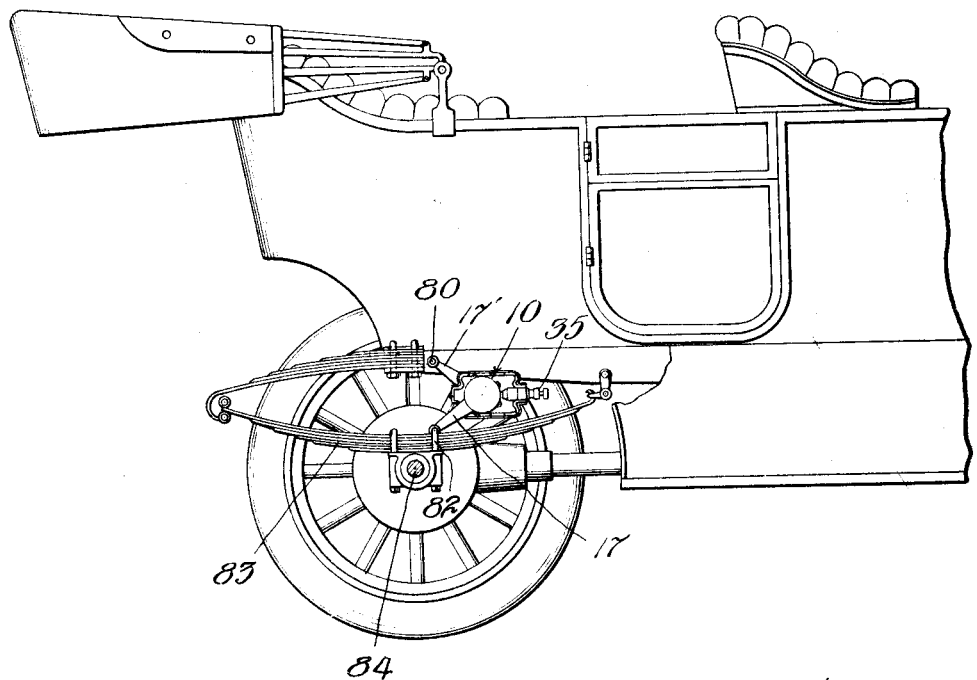
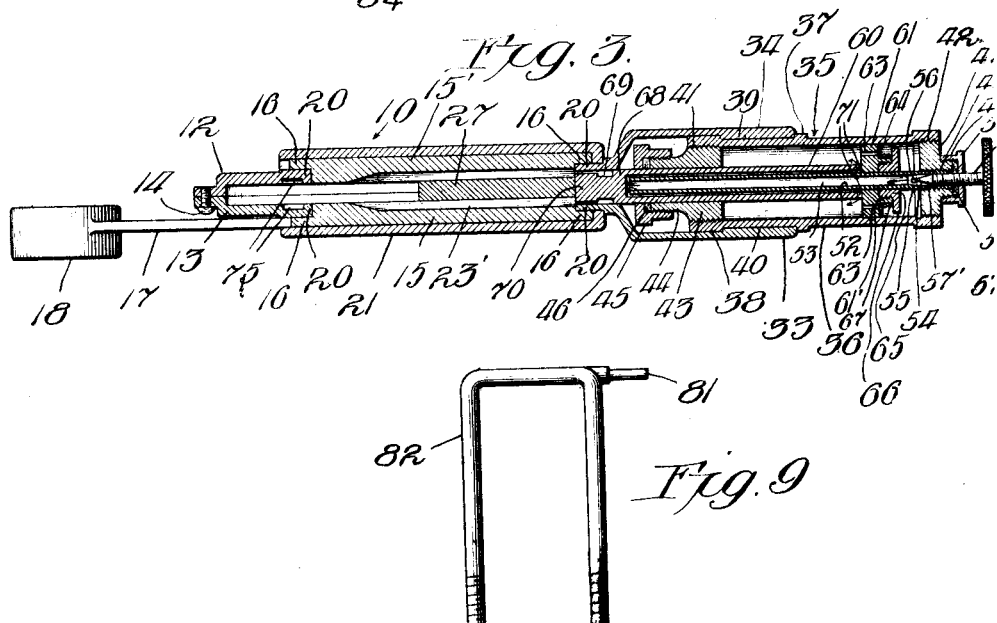
Witnesses:
Harry S. Gaither
Edythe M. Anderson
Inventor
James B. Horne
by Sheridan, Wilkinson Scott & Richmo
Attys.

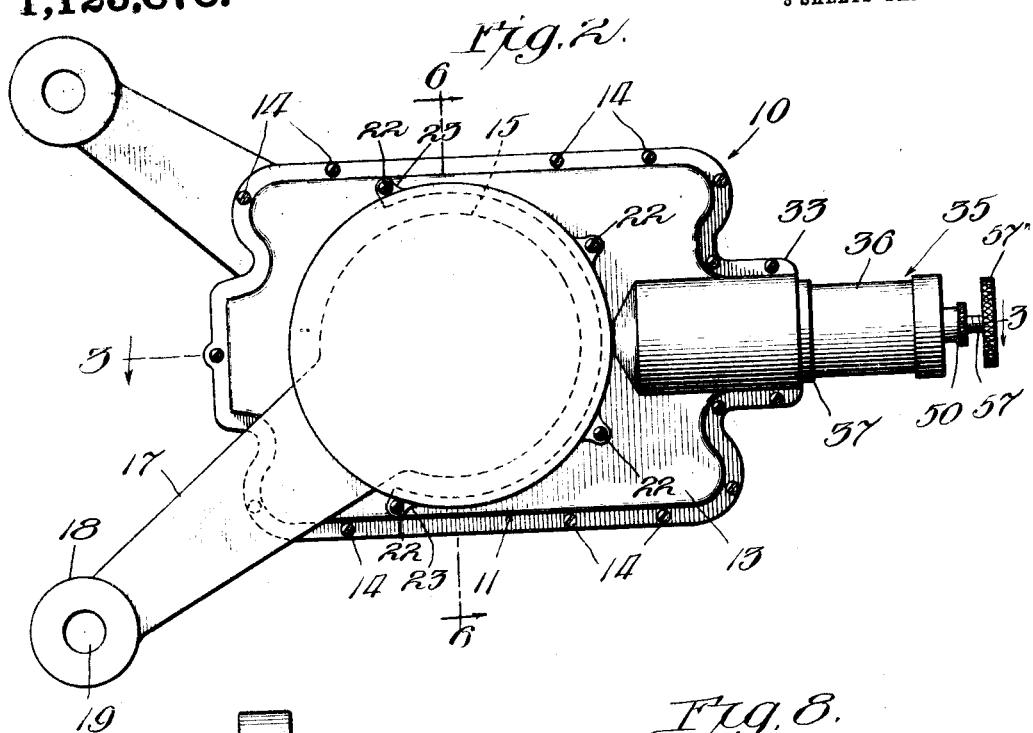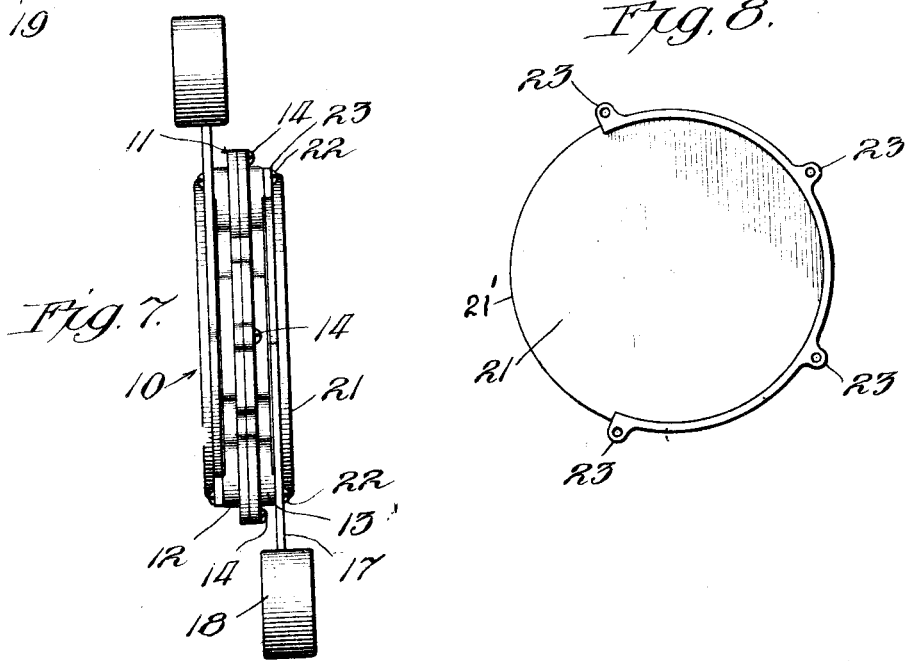

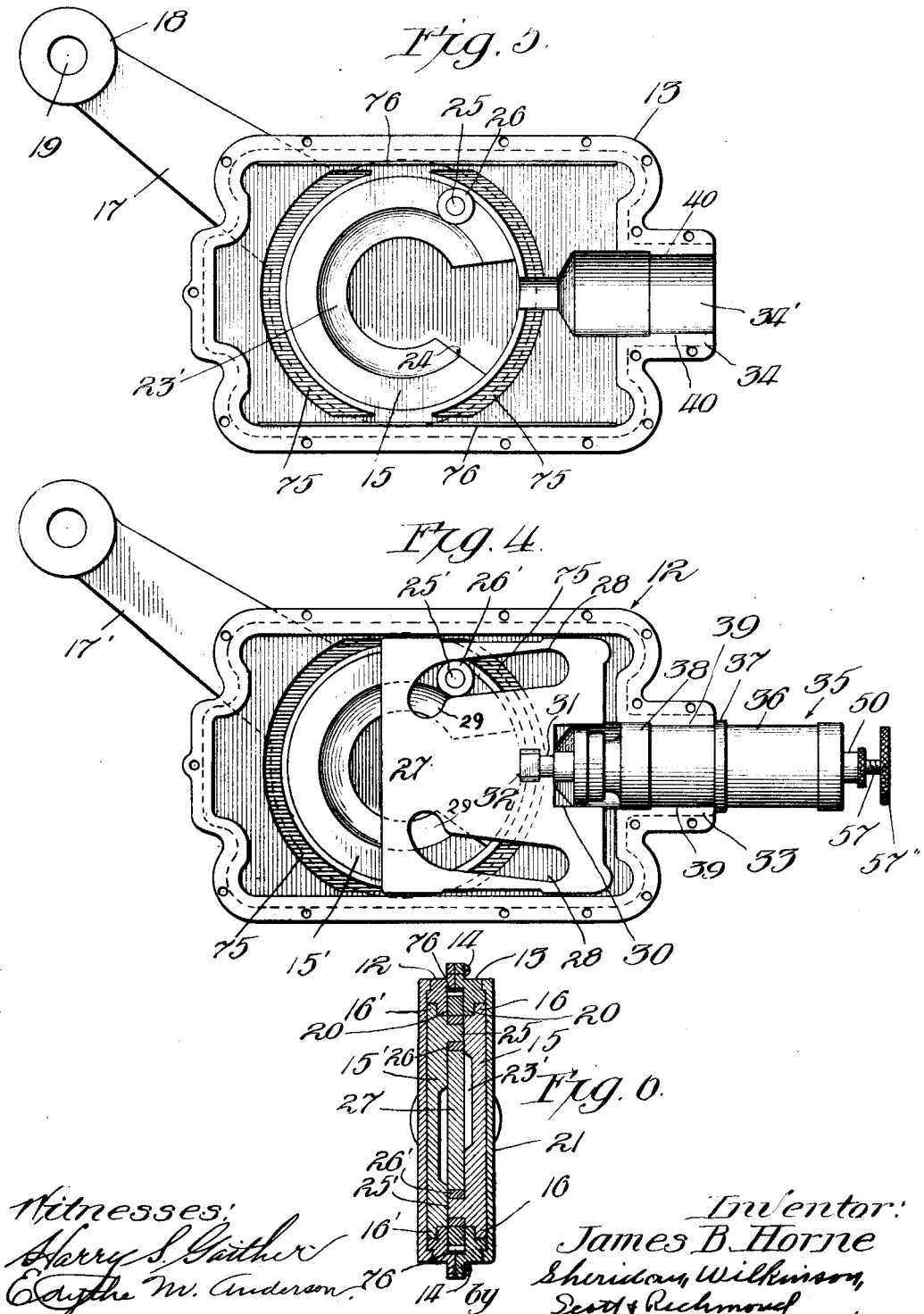

UNITED STATES PATENT OFFICE.

JAMES B. HORNE, OF ST. CHARLES, ILLINOIS.

SHOCK-ABSORBER.

1,123,878.  Specification of Letters Patent.  Patented Jan. 5, 1915.

Application filed March 22, 1912. Serial No. 685,525.

*To all whom it may concern:*

Be it known that I, JAMES B. HORNE, a citizen of the United States, residing at St. Charles, in the county of Kane and State of Illinois, have invented certain new and useful Improvements in Shock-Absorbers, of which the following is a specification.

This invention relates to improvements in shock absorbers.

The object of this invention is to provide an improved device of the class known as shock absorbers for use in dampening the up and down vibrations of a vehicle on its springs when traversing rough roads or traveling over bumps.

Another object of this invention is to provide a device which when used in connection with the springs ordinarily used on a vehicle will tend to greatly retard the movement of the body away from the axles and but slightly retard the return movement of the body or the movement of the body toward the axle. When used in conjunction with what is known as an "over-slung" body.

Another object of this invention is to provide a device of the class mentioned which may be readily disassembled and reassembled.

Other objects of this invention will be apparent from the following specification and the accompanying drawings in which—

Figure 1 is a side elevation showing a portion of a vehicle body with my device secured thereto. Fig. 2 is a side elevation of my device. Fig. 3 is a longitudinal section along the line 3, 3 of Fig. 2. Fig. 4 is a side elevation showing the top half of my device removed. Fig. 5 is a side elevation looking at the inner side of the top half of my device shown removed in Fig. 4. Fig. 6 is a transverse section along the line 6, 6 of Fig. 2. Fig. 7 is an end elevation of my device looking between the arms thereof. Fig. 8 is an elevation of one of the cap members. Fig. 9 is an elevation of a clip member used for attaching my device to the springs.

Like numerals and characters refer to like elements throughout the drawings.

10 designates my shock absorber generally. The casing 11 is formed in two parts 12 and 13, respectively, flanged around their outer periphery and adapted to be joined together by screws 14 or other means. Journaled in the portion 13 of the casing 11 is the disk 15 circular in contour and formed with the peripheral inwardly extending seat 16. Projecting from one portion of the disk 15 and preferably formed integrally therewith is the arm 17 terminating in the enlarged extremity 18 shown apertured at 19. The casing member 13 is centrally apertured and provided with a circular shoulder 20 against which the seat 16 of the disk 15 abuts. This shoulder 20 forms a bearing surface for the disk 15.

Carried by the casing member 13 and covering the outwardly projecting portion of the disk 15 is the cap 21 slotted at 21' to permit the arm 17 to extend therethrough and move relatively to said cap. This cap 21 is preferably secured to the casing 13 by screws 22 or etc., projecting through the lugs 23 of the cap 21.

The disk 15 at its inner side is dished out, as shown at 23' in Fig. 5. Adjacent the upper portion of the disk 15 is the slot or aperture 24, as shown in Fig. 5, communicating with the dished out portion 23' of the disk 15. A stud 25 projects inwardly from the disk 15 adjacent the outer periphery thereof. A roller 26 is rotatably mounted on the stud 25.

The casing member 12 is constructed similar to the member 13 and carries the disk 15' which is similar to the disk 15 journaled therein, as shown in Fig. 4 of the drawings. This disk 15' is provided with the arm 17' similar to the arm 17 and in all other ways is so similarly constructed to the disk 15 as not to require further description here. The disk 15' carries also a stud 25' carrying the roller 26' rotatably mounted thereon. The arrangement of the disks 15 and 15' in their respective casing members is such that when the members 12 and 13 are secured in assembled relation, as shown in Fig. 2 of the drawings, the arms 17 and 17' will diverge outwardly from the casing 11.

A plate 27 is carried between the disks 15 and 15', as shown in Figs. 3 and 4 of the drawings. This plate is adapted to reciprocate in the casing 11 and is provided with a pair of slots 28 symmetrically located with respect to the longitudinal axis of the plate and inclined inwardly a predetermined amount from their upper extremities adjacent the top of the plate downwardly toward the bottom of the plate, as shown in Fig. 4 of the drawings. At the lower extremity of each of these slots they curve inwardly more rapidly, as shown at portions 29 in Fig. 4. The studs 25 and 25' project each into one of these slots 28, the rollers 26 and 26' contacting with the side of the respective slots. When the device is in an assembled position it will be noted that the studs 25 and 25' lie on a line at right angles to the longitudinal axis of the assembled device and above the center of the disks.

The plate 27 is provided at its upper portion with a comparatively small recess 30 communicating through a small slot 31 with a comparatively small recess 32. The casing members 12 and 13 are provided with the upwardly projecting portions 33 and 34, respectively, shown hollowed out at their inner sides as at 34' in Fig. 5.

A retarding member designated generally as 35 is adapted to be firmly held in the hollowed out recess between the portions 33 and 34 of the casing members, as shown in Figs. 2 and 4. This retarding device comprises a cylinder 36 provided with the rib 37 intermediate its extremities and the shoulder or rib 38 adjacent its lower portion. The portions 33 and 34 of the casing are provided with the inwardly projecting shoulders 39 and 40 respectively, which coact with the ribs 37 and 38 of the cylinder 36 to retain the same in seated position and prevent movement thereof.

The cylinder 36 is internally threaded at 41 at one extremity and at 42 at the other extremity. Engaging the threaded portion 41 at one end is a cap 43 projecting forwardly and terminating in a reduced portion 44, as shown in Fig. 3 of the drawings. This cap 43 is centrally apertured and the end 44 thereof is threadedly engaged by the stuffing-box or gland 45 carrying the packing 46. A case 47 engages the threaded end 42 of the cylinder 36 and is centrally apertured and internally threaded at 48. This cap 47 is also provided with an outwardly projecting reduced portion 49 externally threaded and engaged by a flange or stuffing-box 50 carrying packing 51.

A hollow tube 52 threadedly engages the threaded aperture 48 of the cap 47 and projects into the cylinder therefrom. This tube 52 is approximately of co-extensive length with the cylinder 36, as shown in the drawings. This tube 52 has the longitudinal aperture 53 extending therefrom its entire length, this aperture 53 being enlarged adjacent its extremity at 54, the tube being provided with an internal seat 55 adjacent the connection of the larger aperture 54 with a relatively smaller aperture 53. Apertures 56 are provided furnishing communication between the interior of the cylinder and the interior of the tube through the seat 55.

A threaded valve 57 provided with the tapered extremity 57' adapted to seat on the seat 55 of the tube 52 threadedly engages an aperture in the gland 50 and furnishes a means of regulating the admission of fluid from the cylinder 36 into the tube 53, as will be explained hereinafter.

A piston-rod 60 centrally hollowed out and fitting around the tube 52 carries the piston 61 which slidably engages the exterior of the tube 52, and closely fits the interior of the cylinder 36. The piston 61 is provided with passages 63 therein extending between the faces thereof, as shown in Fig. 3. A valve or washer 64 is seated on the upper face of the piston 61 around the shoulder 61' of the piston 61. A bushing 65 threadedly engages the interior of the shoulder 61' of the piston 61 and is provided with the circular outwardly projecting flange 66. A spring 67 is carried between the under side of the flange 66 and the valve washer 64. This spring tends to keep the valve washer 64 normally seated to close the apertures 63 through the piston 61. The piston-rod 60 is formed with a closed end 68 notched at 69 and provided with a head 70 which is adapted to fit the recess 32 in the plate 27, as shown in Fig. 4, the notched portion 69 of the piston-rod fitting in the reduced recess 31 of the plate 27 so that movement of the plate will actuate the piston-rod 60 by means of the engagement of the head 70 thereof. As mentioned above, the piston-rod 60 is made hollow and fits around the tube 53, being spaced therefrom, as shown in Fig. 3.

Apertures 71 are provided in the piston-rod 60 adjacent the under surface of the piston 61. These apertures 71 furnish communication between the interior of the cylinder 36 and the interior of the piston-rod 60. The cylinder 36 is adapted to contain oil or other fluid and by means of the construction described above it will be apparent that an outward movement of the piston-rod 60 and piston 61 from the position shown in Fig. 3 will allow the fluid on the under side of the piston 61 to pass through the apertures 63 unseating the valve washer 64 and flowing into the cylinder on the opposite side of the piston 61. Upon a reverse stroke to the position shown in Fig. 3 the pressure of the fluid will keep the valve 64 in seated position and the only passage for the oil or fluid will be from the cylinder through the apertures 56 down through the aperture 53 in the tube 52, as indicated by the arrows, up around the outside of the tube 52 in the space between said tube and the interior of the piston-rod 60 and out through the aperture 71 into the cylinder again, as indicated by the arrows. The tortuous path along which the fluid is compelled to flow for a movement of the piston 61 to the position shown in Fig. 3 will obviously greatly retard the movement of the piston, whereas a movement outwardly from the position shown in Fig. 3 will be comparatively unretarded owing to the direct pressure of the fluid from one side of the piston to the other.

To regulate the retarding effect due to the movement of the oil or other fluid the valve stem 57 may be moved inwardly or outwardly by means of the knurled head 57″ so that the tapered valve portion 57′ may regulate the flow of liquid through the apertures 56.

The cut away portions 24 in the disks 15 and 15′ provide openings so that a rotation of the disks 15 and 15′ will not bind or hinder the movement of the extremities 70 of the piston-rod. Oil or grease grooves 75 are provided on the interior sections 12 and 13 of the casing, as shown in Figs. 3, 4 and 5 of the drawings. The dished out portions 23 of the disks also provide recesses wherein the grease may be packed to lubricate the moving members of the device.

Upwardly projecting strips 76 are carried by the member 13 and coact with the member 12 to provide side bearing surfaces for the plate 27 and to prevent leakage of the grease through the joints to the sections 12 and 13 in the casing.

The operation of the device is as follows: The arms 17 and 17′ being secured between the members of a vehicle spring or between the body of the vehicle and the axle thereof, upon the wheel of the vehicle striking a bump or projection in the road so as to cause the axle to move toward the body the extremities of the arm 17 and 17′ will be moved together, the movement being retarded somewhat owing to the engagement of the rollers 26 and 26′ with their respective slots 28 in the plate 27. As is apparent in the drawings, these slots being slightly inclined with respect to the vertical a rotation of the disks caused by the movement of the extremities of the arms 17 and 17′ toward each other through the medium of the lugs 25, 25′, and rollers 26, 26′ in the slots 28 will cause the plate 27 to be forced downwardly from the position shown in Fig. 4. This is due to the fact that the lugs 25, 25′ are located above the center of the disk, and upon the rotation mentioned above they will move outwardly from the position shown in Figs. 4 and 5. Since they are continuously in contact with the sides of the slots 28 in order for such slots to correspond with the changing positions of the studs it will be necessary for the plate 27 to be forced down. Obviously the force applied to the sides of the slots by the rollers 26 and 26′ resolved along the axis of the slots will be greatly diminished. In other words a comparatively large force applied to the extremities of the arms 17 and 17′ will be required to force the plate 27 in either direction so that a certain retarding effect is present when the arms 17 and 17′ are moved together as stated. In addition to the retarding effect resulting from the inclination of the slots is that due to the retarding device 35 through the connection of the piston-rod 60 with the plate 27. As mentioned above this retarding effect is comparatively slight on the forward movement of the piston-rod from the position shown in Fig. 4 and is comparatively great on the upward movement of the same to the position shown in Fig. 4 so that the retarding effect due to the engagement of the studs 25 and 25′ and the slots 28 of the plate 27 being equal for both movements of the plate the additive retarding or dampening effect of the member will cause a considerably greater resistance to the movement of the plate on the upward stroke than on the downward stroke so that with the whole device arranged and applied to the machine as shown in the drawings a comparatively slight resistance will be interposed to the movement of the axle of the vehicle toward the body and a comparatively great resistance will be interposed to the movement of the body away from the axle. By this means the beneficial effect of the ordinary springs is preserved, while the unpleasant vibrating of the vehicle after the first shock of encountering a bump is eliminated by the comparatively great resistance to the movement of the body from the axle.

In the practical application shown in Fig. 1 of the drawings, I have secured the apertured extremity of the arms 17′ to a bolt or stud 80 carried by the body of the vehicle wheel. The apertured extremity of the arm 17 is carried on a stud 81 forming part of the U-shaped clip 82 by which the lower half 83 of the spring member is secured to the axle 84 of the vehicle. In this application I have shown my device used in connection with what is known as three-quarter elliptic springs. It is obvious that by slight changes in the method of applying the same this device might be used in connection with half elliptic or full elliptic springs. It is also applicable to use with the type of vehicle known as "under-slung" by reversing the operation of the retarding member 35.

I do not wish to be restricted to the exact form of device shown or described beyond the scope of the appended claims.

I claim:

1. In a shock absorber, a pair of relatively rotatable members, a plate carried between said members, said plate being reciprocable relative to and operatively connected to said members to resist the movement thereof, whereby rotation of said rotatable members will cause relative reciprocation of said plate.

2. In a shock absorber, a pair of relatively rotatable disks, a plate mounted between said disks, said plate being reciprocable relative to and operatively connected to said disks, in such wise that said plate will retard the movement of and be reciprocated relative to said disks, upon rotation of the latter.

3. In a shock absorber, a pair of relatively rotatable members, a plate mounted between said members, said plate being reciprocable relative to and operatively connected to said members, in such wise that rotation of said members will cause relative reciprocation of said plate, and means to resist the movement of said plate.

4. In a shock absorber, arms, a movement resisting plate provided with inclined slots, means carried by said arms engaging the slots in said plate, said plate being reciprocable relative to said arms, whereby rotation of the latter will effect the reciprocation of said plate and resist the movement of said arms.

5. In a shock absorber, a pair of arms, a plate provided with inclined slots, means carried by said arms engaging with slots in said plate, said plate being reciprocable relative to said arms, said slots being so arranged that said plate, while being reciprocated by said arms, will resist the movement thereof.

6. In a shock absorber, a pair of rotatable members, a plate carried between said members, said plate being reciprocable relative to said members and being operatively connected thereto, to resist the movement thereof, rotation of said members being adapted to reciprocate said plate relative thereto, and means to resist the movement of said plate, said means being adapted to furnish a comparatively great resistance to the movement of said plate in one direction, and a comparatively slight resistance to the movement of said plate in the opposite direction.

7. In a device of the class described, a casing, a disk journaled in each side of said casing, and a plate carried between said disks, said plate being provided with inclined slots, said disks being provided with means engaging said slots.

8. In a device of the class described, a pair of disks, a plate carried between said disks, a stud carried by each of said disks, and a roller carried by each of said studs, said plate being provided with a pair of symmetrically disposed inclined slots, said studs and rollers being carried in said slots.

9. In a device of the class described, a pair of disks, a plate carried between said disks, a stud carried by each of said disks, a roller carried by each of said studs, said plate being provided with a pair of symmetrically disposed inclined slots, said studs and rollers being carried in said slots, and means resisting the movement of said plate, said means being detachably secured to said plate.

10. In a device of the class described, a casing, a disk rotatably journaled in each side of said casing, a plate carried between said disks, said plate being provided with slots inclined inwardly and downwardly from adjacent the top thereof, each of said disks being provided with an inwardly projecting stud and roller engaging one of said slots, a fluid containing cylinder adapted to be securely seated in said casing, a piston carried in said cylinder, and a piston-rod secured to said cylinder and projecting therefrom, the extremity of said piston-rod being adapted to be detachably secured to said plate, the movement of said piston and piston-rod being adapted to be resisted by the fluid in said cylinder.

11. In a device of the class described, a casing, a disk rotatably journaled in each side of said casing, a plate carried between said disks, said plate being provided with slots inclined inwardly and toward each other from adjacent one end thereof, each of said disks being provided with an inwardly projecting stud and roller engaging one of said slots, a fluid containing cylinder adapted to be securely seated in said casing, a piston carried in said cylinder, and a piston-rod secured to said piston and projecting therefrom, the extremity of said piston-rod being adapted to be detachably secured to said plate, the movement of said piston and piston-rod being adapted to be resisted by the fluid in said cylinder, said piston being constructed to permit the flow of said liquid therethrough when moving in one direction.

12. In a device of the class described, a casing, a disk rotatably journaled in each side of said casing, a plate carried between said disks, said plate being provided with slots inclined inwardly and downwardly from adjacent the top thereof, each of said disks being provided with an inwardly projecting stud and roller engaging one of said slots, a fluid containing cylinder adapted to be securely seated in said casing, a piston carried in said cylinder, and a piston-rod secured to said piston and projecting therefrom, the extremity of said piston-rod being adapted to be detachably secured to said plate, the movement of said piston and piston-rod being adapted to be resisted by the fluid in said cylinder, said piston-rod being constructed to permit the flow of liquid from one side of the piston to the other when the latter is moving.

13. In a device of the class described, a casing, a disk rotatably journaled in each side of said casing, a plate carried between said disks, said plate being provided with slots inclined inwardly and downwardly from adjacent the top thereof, each of said disks being provided with an inwardly projecting stud and roller engaging one of said slots, a fluid containing cylinder adapted to be securely seated in said casing, a piston carried in said cylinder, and a piston-rod secured to said piston and projecting therefrom the extremity of said piston-rod being adapted to be detachably secured to said plate, the movement of said piston and piston-rod being adapted to be resisted by the fluid in said cylinder, said piston being constructed to permit the flow of said liquid therethrough when moving in one direction, said piston-rod being adapted to permit the flow of liquid therethrough from either side of said piston.

14. In a device of the class described, a casing comprising a pair of separable sections, said sections each being provided with a depressed flange portion, said depressed portions forming an aperture when said sections are united, the wall of said aperture being provided with a groove therein, and a cylinder adapted to closely fit in said aperture, said cylinder being provided with a collar seating in said groove of said aperture wall, rotatable members mounted in said casing, and movement resisting means carried by said cylinder, said rotatable members being operatively connected to said resisting means.

In testimony whereof, I have subscribed my name.

JAMES B. HORNE.

Witnesses:
HENRY A. PARKS,
EDYTHE M. ANDERSON.